United States Patent
Chen et al.

(10) Patent No.: US 10,028,285 B2
(45) Date of Patent: Jul. 17, 2018

(54) METHOD, DEVICE AND TERMINAL FOR ALLOCATING NETWORK SERVICES TO DATA CHANNELS

(71) Applicant: YULONG COMPUTER TELECOMMUNICATION SCIENTIFIC (SHENZHEN) CO., LTD., Shenzhen (CN)

(72) Inventors: Xiang Chen, Shenzhen (CN); Kai Ren, Shenzhen (CN); Fei Shang, Shenzhen (CN)

(73) Assignee: YULONG COMPUTER TELECOMMUNICATION SCIENTIFIC, Shenzhen (CN)

( * ) Notice: Subject to any disclaimer, the term of this patent is extended or adjusted under 35 U.S.C. 154(b) by 86 days.

(21) Appl. No.: 15/219,302

(22) Filed: Jul. 26, 2016

(65) Prior Publication Data

US 2016/0338069 A1 Nov. 17, 2016

Related U.S. Application Data

(63) Continuation-in-part of application No. PCT/CN2014/072238, filed on Feb. 19, 2014.

(51) Int. Cl.
*H04W 4/00* (2018.01)
*H04W 72/08* (2009.01)
*H04W 72/10* (2009.01)
*H04W 72/02* (2009.01)
*H04W 88/06* (2009.01)

(52) U.S. Cl.
CPC .......... *H04W 72/08* (2013.01); *H04W 72/02* (2013.01); *H04W 72/10* (2013.01); *H04W 88/06* (2013.01)

(58) Field of Classification Search
CPC ..... H04W 72/08; H04W 72/02; H04W 72/10; H04W 88/06
See application file for complete search history.

(56) References Cited

U.S. PATENT DOCUMENTS

| | | | | |
|---|---|---|---|---|
| 2010/0248771 A1* | 9/2010 | Brewer | ................. | H04W 72/10 455/518 |
| 2012/0300629 A1* | 11/2012 | Drucker | ............ | H04W 28/0205 370/235 |
| 2014/0198707 A1* | 7/2014 | Wang | .................. | H04W 72/005 370/312 |

* cited by examiner

*Primary Examiner* — Abdelnabi O Musa
(74) *Attorney, Agent, or Firm* — ScienBiziP, P.C.

(57) ABSTRACT

A method for allocating network data channels is provided. The method includes acquiring performance parameters of each network data channel enabled in a terminal; and according to the performance parameters of each network data channel and requirements of any initiated network service in the terminal, allocating the initiated network service to a corresponding network data channel. A device for allocating network data channels and a terminal are also provided. The method, the device and the terminal allocates a network service to a corresponding network data channel reasonably according to actual requirements of the network service, thus each of a plurality of network services executed simultaneously can provide better user experience.

20 Claims, 6 Drawing Sheets

METHOD, DEVICE AND TERMINAL FOR ALLOCATING NETWORK SERVICES TO DATA CHANNELS

CROSS-REFERENCE TO RELATED APPLICATIONS

This application is a continuation-in-part of International Application No. PCT/CN2014/072238, filed on Feb. 19, 2014.

FIELD

The embodiments of the present disclosure relate to communication technology, and specifically to a method, a device and a terminal for allocating network data channels.

BACKGROUND

In prior art, a terminal may establish a network data channel, such as Wi-Fi, fourth generation (4G) (e.g., time-division duplexing Long-Term Evolution (TDD-LTE) or Long-Term Evolution frequency division duplexing (LTE-FDD)), third generation (3G) (e.g., Time Division Synchronous Code Division Multiple Access (TD-SCDMA), Code division multiple access (CDMA) 2000, Wideband Code Division Multiple Access (WCDMA)), second-generation wireless telephone technology (2G) (e.g., Global System for Mobile Communications (GSM), Enhanced Data rates for GSM Evolution (EDGE)), to implement data interaction of network services as requested by the terminal.

However, a current terminal can establish only a single network data channel at one time. Thus, all network services requested by the terminal have to utilize the single network data channel to implement the data interaction, thereby, the single network data channel cannot satisfy requirements of all of the network services when the network services are required for large amounts of data exchanges. Thus, network transmission capacity provided by the single network data channel cannot support all the network services, and user experiences are affected correspondingly.

Therefore, utilizing a plurality of network data channels supported by the terminal to implement allocation of a plurality of network services reasonably, and satisfying user requirements during a concurrent execution procedure of the plurality of network services are problematic.

SUMMARY OF THE INVENTION

To solve the above problem, the present disclosure provides a new way, which can allocate a network service to a corresponding network data channel reasonably according to actual requirements of the network service. Simultaneous execution of a plurality of network services provides a better user experience.

Therefore, according to one aspect of the present disclosure, a method for allocating network data channels is provided. The method includes: acquiring performance parameters of each network data channel enabled in a terminal; and according to the performance parameters of each network data channel and requirements of any initiated network service in the terminal, allocating the initiated network service to a corresponding network data channel.

In the above embodiment, by removing a quantity limit of the network data channels enabled in the terminal, namely all network data channels supported by the terminal can be enabled at the same time, a plurality of concurrent network services of the terminal can be allocated to different network data channels. Thus, network resources of the network data channels can be utilized sufficiently, to avoid the plurality of network services occupying network source of a same network data channel, and improve the user experience.

By acquiring the performance parameters of each network data channel and the requirements of any initiated network service, the initiated network service is allocated to a corresponding network data channel reasonably, thereby a plurality of network services can implement high speed network interactions at the same time.

In the above embodiment, preferably, the terminal acquires the performance parameters of each network data channel by: acquiring the performance parameters of each network data channel from network side; or executing a data transmission test of each network data channel, and calculating the performance parameters corresponding to each network data channel; or determining the performance parameters of each network data channel according to stored historical performance parameters.

In the above embodiment, it is helpful to ensure instantaneity and validity of the performance parameters by testing the performance parameters of the network data channels on the network side in real-time, thus the network services can be allocated more reasonably. In addition, a determination of current performance parameters of the network data channels according to the historical performance parameters is helpful in reducing transmission amount of network data and avoiding occupying corresponding network resources.

In the above embodiment, preferably, a procedure of allocating the initiated network service to the corresponding network data channel includes: calculating a weighting value of the initiated network service according to the requirements of any initiated network service; determining a corresponding weighting value range of each network data channel according to the performance parameters of each network data channel; and allocating the initiated network service to a network data channel, whose weighting value range includes the weighting value of the initiated network service.

In the above embodiment, the weighting value of the initiated network service represents a performance requirement of the initiated network service to the network data channel. By determining the corresponding weighting value range according to the performance parameters of each network data channel, a weighting relationship can be established between the initiated network service and each network data channel, thereby a network service allocation procedure can be quantized to implement an allocation of any initiated network service.

In the above embodiment, preferably, when the network data channel has been occupied by another network service, the method further includes: determining whether performance parameters of the network data channel satisfy both of the initiated network service and another network service; allocating the initiated network service to the network data channel under the condition that the performance parameters of the network data channel satisfy both of the initiated network service and another network service, or allocating the initiated network service to another idle network data channel under the condition that the performance parameters of the network data channel does not satisfy both of the initiated network service and another network service.

In the above embodiment, generally, as a single network service does not occupy all network resources of one network data channel, thus, by determining the performance parameters of the network data channel, one network service can be allocated more accurately to avoid wasting the network resources.

In the above embodiment, preferably, when the initiated network service has been allocated to another idle network data channel, the method further includes: reallocating the initiated network service to the network data channel under the condition that the network data channel has been detected to be idle or the performance parameters of the network data channel have been changed to satisfy the initiated network service.

In the above embodiment, a relationship between the initiated network service and the network data channel can be restored by monitoring a status of the network data channel. When an allocation of the initiated network service is changed from a high-performance network data channel to a low-performance network data channel, it is helpful to avoid influencing an implementation of another network service which requires high performance. When the allocation of the initiated network service is changed from the low-performance network data channel to the high-performance network data channel, it is helpful for the initiated network service to utilize better network resources, thereby improving a processing speed of the initiated network service.

In the above embodiment, preferably, a procedure of allocating the initiated network service to the corresponding network data channel includes: calculating a weighting value of the initiated network service according to the requirements of any initiated network service; and allocating the initiated network service to a corresponding network data channel according to matching relationships between a sequence of a plurality of weighting values of a plurality of initiated network services and a sequence of performance parameters of each network data channel.

In the above embodiment, no quantization relationship exists between each weighting value and each network data channel, and a network data channel is determined to be occupied by each of the plurality of initiated network services merely according to the sequence of the plurality of weighting values of the plurality of initiated network services. By allocating an initiated network service having high weighting value to a high-performance network data channel and allocating an initiated network service having low weighting value to a low-performance network data channel, an initiated network service having higher weighting value can be always allocated to a network data channel having higher performance, thereby a higher processing efficiency is ensured.

In the above embodiment, preferably, when all network data channels have been occupied and no network data channel satisfy the initiated network service, the method further includes: adding the initiated network service into a waiting queue; and/or generating a corresponding prompt message for a user.

In the above embodiment, when all network data channels have been occupied and the initiated network service cannot be allocated and implemented, the initiated network service can be implemented in sequence by establishing the waiting queue. In addition, one more important network service can be implemented timely by generating the prompt message for the user, such as a prompt message indicating the user that a current network service cannot be processed in time, or indicating the user to close some network services.

In the above embodiment, preferably, the performance parameters include bandwidth information and/or speed information of each network data channel; and/or the requirement includes the a speed requirement and/or importance of the initiated network service.

In the above embodiment, the performance of the network data channel can be reflected by the bandwidth information, the speed information, and so on. The requirement of the initiated network service can be reflected by the speed requirement, the importance, and so on. In addition, the importance of the initiated network service can be reflected by instantaneity, privacy, priority, and so on.

According to a second aspect of the present disclosure, a device for allocating network data channels includes: a parameter acquisition unit configured to acquire performance parameters of each network data channel enabled in a terminal; and a service allocation unit configured to, according to the performance parameters of each network data channel and requirements of any initiated network service in the terminal, allocate the initiated network service to a corresponding network data channel.

In the above embodiment, by removing a quantity limit of the network data channels enabled in the terminal, namely all network data channels supported by the terminal can be enabled at the same time, a plurality of concurrent network services of the terminal can be allocated to different network data channels. Thus, network resources of the network data channels can be utilized sufficiently, thereby avoiding the plurality of network services occupying network source of a same network data channel, and improving the user experience.

By acquiring the performance parameters of each network data channel and the requirements of any initiated network service, the initiated network service is allocated to a corresponding network data channel reasonably, thereby a plurality of network services can implement high speed network interactions at the same time.

In the above embodiment, preferably, the parameter acquisition unit acquires the performance parameters of each network data channel from network side; or executes a data transmission test of each network data channel, and calculates the performance parameters corresponding to each network data channel; or determines the performance parameters of each network data channel according to stored historical performance parameters.

In the above embodiment, it is helpful to ensure instantaneity and validity of the performance parameters by testing the performance parameters of the network data channels on the network side in real-time, thus the network services can be allocated more reasonably. In addition, a determination of current performance parameters of the network data channels according to the historical performance parameters is helpful in reducing transmission amount of network data and avoiding occupying corresponding network resources.

In the above embodiment, preferably, the service allocation unit includes: a weighting calculation subunit configured to calculate a weighting value of the initiated network service according to the requirements of any initiated network service, and determine a corresponding weighting value range of each network data channel according to the performance parameters of each network data channel; and a weighting matching subunit configured to allocate the initiated network service to a network data channel, whose weighting value range includes the weighting value of the initiated network service.

In the above embodiment, the weighting value of the initiated network service represents a performance requirement of the initiated network service to the network data channel. By determining the corresponding weighting value range according to the performance parameters of each network data channel, a weighting relationship can be established between the initiated network service and each network data channel, thereby a network service allocation procedure can be quantized to implement an allocation of any initiated network service.

In the above embodiment, preferably, the service allocation unit further includes: a performance determination subunit configured to determine whether performance parameters of the network data channel satisfy both of the initiated network service and another network service; an allocation execution subunit configured to allocate the initiated network service to the network data channel under the condition that the performance parameters of the network data channel satisfy both of the initiated network service and another network service, or allocate the initiated network service to another idle network data channel under the condition that the performance parameters of the network data channel does not satisfy both of the initiated network service and another network service.

In the above embodiment, generally, as a single network service does not occupy all network resources of one network data channel, thus, by determining the performance parameters of the network data channel, one network service can be allocated more accurately to avoid wasting the network resources.

In the above embodiment, preferably, the service allocation unit further includes: a reallocation subunit configured to reallocate the initiated network service to the network data channel under the condition that the network data channel has been detected to be idle or the performance parameters of the network data channel have been changed to satisfy the initiated network service.

In the above embodiment, a relationship between the initiated network service and the network data channel can be restored by monitoring a status of the network data channel. When an allocation of the initiated network service is changed from a high-performance network data channel to a low-performance network data channel, it is helpful to avoid influencing an implementation of anther network service which requires high performance. When the allocation of the initiated network service is changed from the low-performance network data channel to the high-performance network data channel, it is helpful for the initiated network service to utilize better network resources, thereby improving a processing speed of the initiated network service.

In the above embodiment, preferably, the service allocation unit includes: a weighting calculation subunit configured to calculate a weighting value of the initiated network service according to the requirements of any initiated network service; and a weighting matching subunit configured to allocate the initiated network service to a corresponding network data channel according to matching relationships between a sequence of a plurality of weighting values of a plurality of initiated network services and a sequence of performance parameters of each network data channel.

In the above embodiment, no quantization relationship exists between each weighting value and each network data channel, and a network data channel is determined to be occupied by each of the plurality of initiated network services merely according to the sequence of the plurality of weighting values of the plurality of initiated network services. By allocating an initiated network service having high weighting value to a high-performance network data channel and allocating an initiated network service having low weighting value to a low-performance network data channel, an initiated network service having higher weighting value can be always allocated to a network data channel having higher performance, thereby a higher processing efficiency is ensured.

In the above embodiment, preferably, the device further includes a queue generation unit and/or an information generation unit: the queue generation unit configured to add the initiated network service in a waiting queue when all network data channels have been occupied and no network data channel satisfy the initiated network service; the information generation unit configured to generate a corresponding prompt message for a user when all network data channels have been occupied and no network data channel satisfy the initiated network service.

In the above embodiment, when all network data channels have been occupied and the initiated network service cannot be allocated and implemented, the initiated network service can be implemented in sequence by establishing the waiting queue. In addition, one more important network service can be implemented timely by generating the prompt message for the user, such as a prompt message indicating the user that a current network service cannot be implemented in time, or indicating the user to close some network services.

In the above embodiment, preferably, the performance parameters include bandwidth information and/or speed information of each network data channel; and/or the requirement includes the a speed requirement and/or importance of the initiated network service.

In the above embodiment, the performance of the network data channel can be reflected by the bandwidth information, the speed information, and so on. The requirement of the initiated network service can be reflected by the speed requirement, the importance, and so on. In addition, the importance of the initiated network service can be reflected by instantaneity, privacy, priority, and so on.

According to a third aspect of the present disclosure, a terminal, which includes the device for allocating network data channels as mentioned in any of above embodiments, is provided.

The above embodiments can allocate a network service to a corresponding network data channel reasonably according to actual requirements of the network service, thus each of a plurality of network services executed simultaneously can provide better user experience.

DETAILED DESCRIPTION

For clarity of illustration of objectives, features and advantages of the present disclosure, where appropriate, the above drawings combined with detailed description illustrate the embodiments of the present disclosure hereinafter. It may be appreciated that different embodiments and elements in the different embodiment of the present disclosure can be combined, when there is no complicit.

The embodiments described herein are for better understanding of the present disclosure, other embodiments can also be practiced. The description is not to be considered as limiting the scope of the embodiments described herein.

Figure 1:
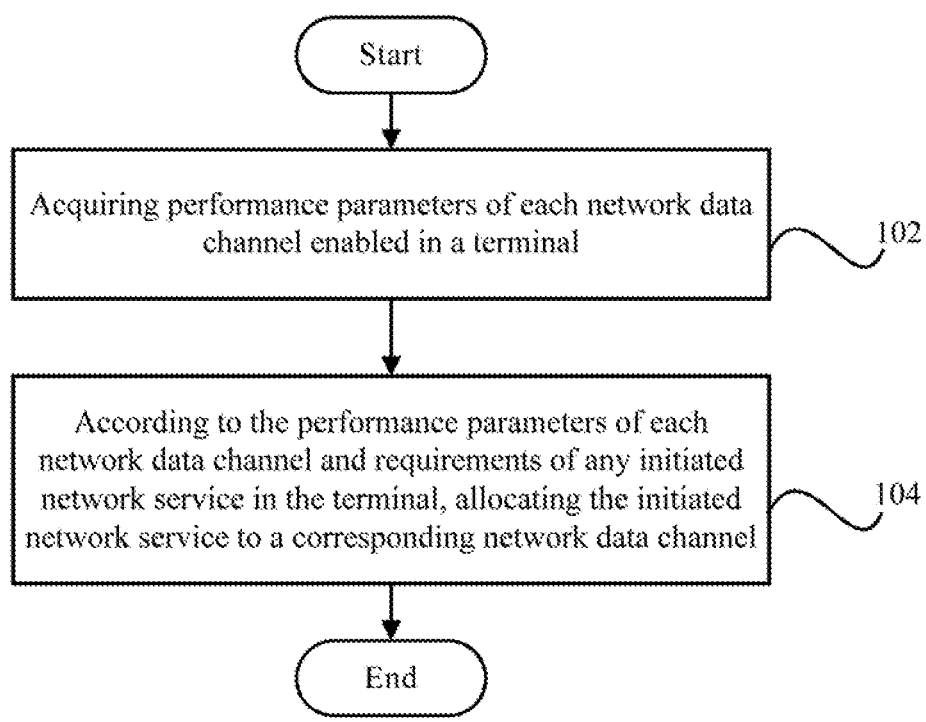
FIG. 1 shows a schematic flowchart of one embodiment of a method for allocating network data channels according to the present disclosure.

FIG. 1 shows a schematic flowchart of one embodiment of a method for allocating network data channels according to the present disclosure.

As shown in FIG. 1, according to one embodiment of the present disclosure, the method for allocating network data channels includes:

step 102, acquiring performance parameters of each network data channel enabled in a terminal;

step 104, according to the performance parameters of each network data channel and requirements of any initiated network service in the terminal, allocating the initiated network service to a corresponding network data channel.

In the above embodiment, by removing a quantity limit of the network data channels enabled in the terminal, namely all network data channels supported by the terminal can be enabled at the same time, a plurality of concurrent network services of the terminal can be allocated to different network data channels. Thus, network resources of the network data channels can be utilized sufficiently, to avoid the plurality of network services occupying network source of a same network data channel, and improve the user experience.

By acquiring the performance parameters of each network data channel and the requirements of any initiated network service, the initiated network service is allocated to a corresponding network data channel reasonably, thereby a plurality of network services can implement high speed network interactions at the same time.

First, the performance parameters:

in step 102 as shown in FIG. 1, acquisition of the performance parameters of each network data channel can be implemented by utilizing a plurality of ways, some embodiments of the ways are provided as follows:

In a first embodiment, a procedure of acquiring the performance parameters of each network data channel by the terminal includes: acquiring the performance parameters of each network data channel from network side.

In detail, in a preferred embodiment, the performance parameters of each network data channel are preset by the network side, such as a sequence of performances of Wi-Fi, Long-Term Evolution (LTE), Wideband Code Division Multiple Access (WCDMA), and General Packet Radio Service (GPRS) can be defaulted as: Wi-Fi>LTE>WCDMA>GPRS. In addition, the above sequence can be represented by a more quantized way, such as setting corresponding performance values (or value ranges), for example.

In another preferred embodiment, the performance parameters of each network data channel can be acquired by the network side in real-time, such as acquiring the performance parameters of each network data channel from corresponding servers or base stations, or executing a performance test of each network data channel by the network side. For example, the network side may transmit a predetermined test data packet through a corresponding network data channel to determine corresponding performance parameters in real-time.

In the above embodiment, it is helpful to determine the performance parameters of each network data channel in a short time according to predetermined data, and to reduce waiting time of a user. Moreover, it is helpful to acquire more accurate performance parameters by acquiring or testing in real-time, thus a corresponding network service can be allocated more accurately and reasonably.

In a second embodiment, the procedure of acquiring the performance parameters of each network data channel by the terminal includes: executing a data transmission test of each network data channel, and calculating the performance parameters corresponding to each network data channel.

In the second embodiment, the terminal executes a real-time test of the performance parameters of each network data channel, thus, more accurate performance parameters can be acquired and a corresponding network service can be allocated more accurately and reasonably.

In detail, the terminal can transmit the predetermined test data packet through each network data channel tentatively, and record corresponding performance parameters in real-time.

In a third embodiment, the procedure of acquiring the performance parameters of each network data channel by the terminal includes: determining the performance parameters of each network data channel according to stored historical performance parameters.

In detail, the terminal stores and calculates historical performance parameters of each network data channel, such as calculating an average of corresponding performance parameters of a network data channel (or utilize another algorithm, e.g., a weighted average method) to be a current real-time performance parameter.

For the purpose of avoiding inaccuracies of non real-time historical performance parameters and instant data generated in an actual test, one or more of the above embodiments can be combined, thereby determining real-time performance parameters of each network data channel.

Secondly, channel allocations:

in step 104 as shown in FIG. 1, an allocation of a network service can be implemented by utilizing a plurality of ways, some embodiments of such ways are provided as follows:

In a first embodiment, preferably, a procedure of allocating the initiated network service to the corresponding network data channel includes: calculating a weighting value of the initiated network service according to the requirements of any initiated network service; determining a corresponding weighting value range of each network data channel according to the performance parameters of each network data channel; and allocating the initiated network service to a network data channel, whose weighting value range includes the weighting value of the initiated network service.

In the above embodiment, the weighting value of the initiated network service represents a performance requirement of the initiated network service in relation to the network data channel. By determining the corresponding weighting value range according to the performance parameters of each network data channel, a weighting relationship can be established between the initiated network service and each network data channel, thereby a network service allocation procedure can be quantized to implement an allocation of any initiated network service.

TABLE 1

| Channel types | Weighting value range |
|---|---|
| Wi-Fi | 100~76 |
| LTE | 75~51 |
| WCDMA | 50~26 |
| GPRS | 1~25 |

In one embodiment, it is assumed that the terminal supports a plurality of network data channels, such as Wi-Fi, LTE, WCDMA, GPRS, for example. In table 1, a group of setting data of a weighting value range of each network data channel is listed. By setting the weighting value range, the allocation of the initiated network service can be quantized and easy to implement.

TABLE 2

| Service type | Weighting value |
|---|---|
| Network directed broadcast | 85 |
| Data downloading | 70 |
| Instant chat | 18 |

Figure 2:
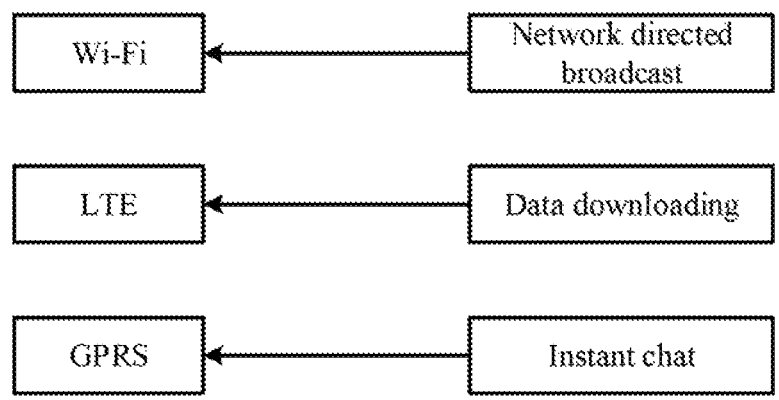
FIG. 2 shows a schematic diagram of one embodiment of allocations of network data channels according to the present disclosure.

It is assumed that a plurality of network services, such as "network directed broadcast," "data downloading," "instant chat," simultaneously exist in the terminal. Based on requirements of the network services, a corresponding weighting value of a network service is calculated as shown in table 2. Combining table 1 with table 2, a schematic diagram of one embodiment of allocations of the network data channels according to the present disclosure is shown in FIG. 2. Namely, the "network directed broadcast" service can be implemented through the Wi-Fi channel; the "data downloading" service can be implemented through the LTE channel; and the "instant chat" service can be implemented through the GPRS channel.

Figure 3:
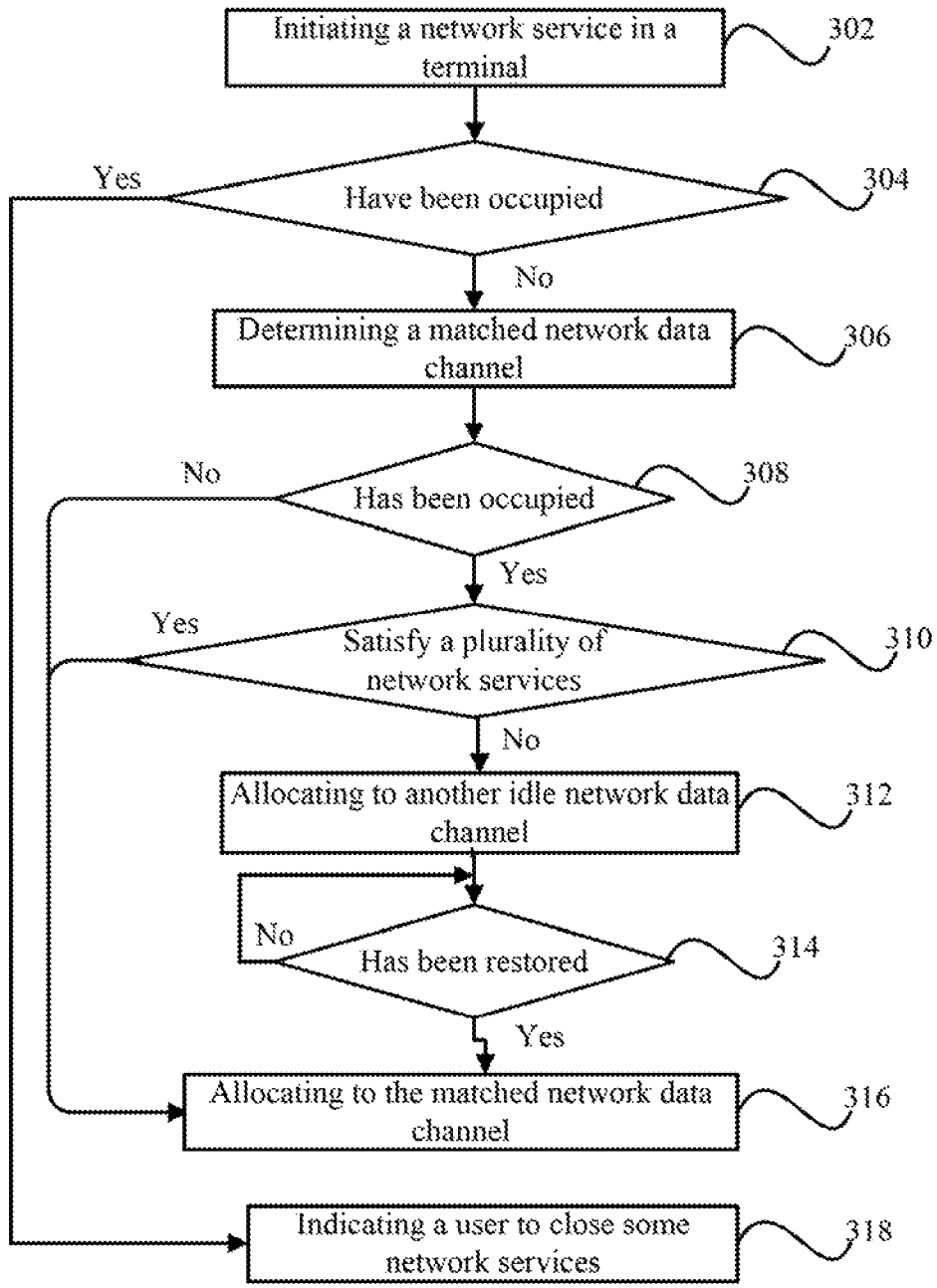
FIG. 3 shows a schematic flowchart of one embodiment of allocations of the network data channels according to the present disclosure.

During a procedure of allocations of the network data channels, other situations can be occurred, detailed descriptions combined with FIG. 3 are provided below. FIG. 3 shows a schematic flowchart of one embodiment of allocations of the network data channels according to the present disclosure.

As shown in FIG. 3, according to one embodiment of the present disclosure, the procedure of allocations of the network data channels includes:

step 302, a network service is initiated in the terminal.

Step 304, determining whether all network data channels enabled in the terminal have been occupied. When all network data channels enabled in the terminal have been occupied, step 318 is executed, otherwise step 306 is executed.

In detail, "all network data channels have been occupied" may include following two situations:

First, only one network service has been allocated to each of the network data channels, thus, when all network data channels have been allocated corresponding network services, it is determined that all network data channels have been occupied.

Second, each of the network data channels has been allocated one or more network services, thus, when each of the network data channels has been allocated one corresponding network service, it is determined whether surplus network resources exist, and it is further determined whether the surplus network resources are enough to allocate to a current initiated network service.

For example, it is assumed that the current initiated network service needs a 30M (30 mbps) bandwidth. Even though a network data channel has been allocated network service(s) already, when surplus network resources of the network data channel is equal to or more than 30M, it is determined that "not all network data channels have been occupied." Otherwise, it is determined that all network data channels have been occupied.

TABLE 3

| Service type | Weighting value |
|---|---|
| Network directed broadcast | 85 |
| IP phone | 80 |
| Data downloading | 70 |
| Email transmission | 20 |
| Instant chat | 18 |

Figure 4:
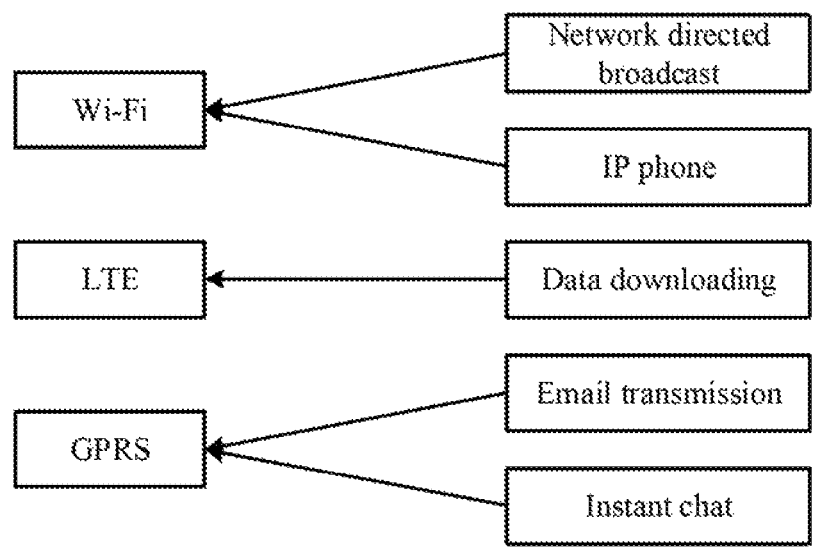
FIG. 4 shows a schematic diagram of another embodiment of allocations of the network data channels according to the present disclosure.

In detail, combining table 1 and table 3, a schematic diagram of another embodiment of the allocations of the network data channels according to the present disclosure is shown in FIG. 4. Namely, the "network directed broadcast" service and the "IP (Internet Protocol) phone" service can be implemented through the Wi-Fi channel; the "data downloading" service can be implemented through the LTE channel; and the "Email transmission" service and the "instant chat" service can be implemented through the GPRS channel.

Step 306, a matched network data channel that matches with the current network service is determined.

In detail, by utilizing the above mentioned method, based on "the weighting value range" and "weighting values", the current network service can be matched to a network data channel.

Step 308, determining whether the matched network data channel has been occupied. If the matched network data channel has been occupied, step 310 is executed, otherwise step 316 is executed.

Step 310, regarding the matched network data channel which has been occupied, determining whether the matched network data channel can satisfy allocated network service(s) and the current network service. Namely, it is determined whether surplus network resources of the matched network data channel satisfy the current network service.

In detail, the surplus network resources of the matched network data channel can be considered according to bandwidth, speed or other information. If the surplus network resources of the matched network data channel satisfy the current network service, step 316 is executed, otherwise step 312 is executed.

Step 312, the current network service is allocated to another idle network data channel.

In detail, another idle network data channel can be selected by utilizing following methods:

First, preferably, a network data channel having higher performance parameters is selected, to avoid influencing processing efficiency of the current network service.

In addition, when a plurality of network data channels have higher performance parameters, the network data channel can be selected according to a sequence of the performance parameters from low to high, to avoid influencing another network service which has higher requirements.

Second, if no network data channel has higher performance parameters, a network data channel having lower performance parameters can be selected.

In addition, when a plurality of network data channels all have lower performance parameters, the network data channel can be selected according to a sequence of the performance parameters from high to low, to avoid influencing the processing efficiency of the current network service.

Step 314, during a procedure of processing the current network service, the terminal monitors the matched network data channel and determines whether the matched network data channel has restored.

In detail, restoring of the matched network data channel can include two situations: first, the matched network data channel restores to be idle; second, the matched network data channel restores to satisfy the current network service (e.g., one network service stops utilizing the matched network data channel, while other network service(s) continues to utilize the matched network data channel), then the current network service is reallocated to the matched network data channel.

In some embodiments, when an allocation of a network service is changed from a high-performance network data channel to a low-performance network data channel, it is helpful to avoid influencing an implementation of another network service which requires high performance. When the allocation of the network service is changed from the low-performance network data channel to the high-performance network data channel, it is helpful for the network service to utilize better network resources, thereby improving a processing speed of the initiated network service.

Step 316, the current network service is allocated to the matched network data channel.

In some embodiments, when the current network service is changed from one network data channel to the matched network data channel, an data interaction procedure of the current network service, which is executing, is paused. In other embodiments, the current network service is restored to the matched network data channel when no data interaction procedure of the current network service is executing, thereby avoid influencing the user experience.

Step 318, when all network data channels have been occupied and no network data channel satisfy the current network service, the current network service is added into a waiting queue; and/or a corresponding prompt message is generated for a user In the above embodiment, when all network data channels have been occupied and the initiated network service cannot be allocated and implemented, the initiated network service can be implemented in sequence by establishing the waiting queue. In addition, one more important network service can be implemented timely by generating the prompt message for the user, such as a prompt message indicating the user that a current network service cannot be implemented in time, or indicating the user to close some network services.

In a second embodiment,

Preferably, a procedure of allocating any initiated network service to the corresponding network data channel includes: calculating a weighting value of the initiated network service according to the requirements of the initiated network service; and allocating the initiated network service to a corresponding network data channel according to matching relationships between a sequence of a plurality of weighting values of a plurality of initiated network services and a sequence of performance parameters of each network data channel.

In the above embodiment, no quantization relationship exists between each weighting value and each network data channel, and a network data channel is determined to be occupied by each of the plurality of initiated network services merely according to the sequence of the plurality of weighting values of the plurality of initiated network services. By allocating an initiated network service having high weighting value to a high-performance network data channel and allocating an initiated network service having low weighting value to a low-performance network data channel, an initiated network service having higher weighting value can always be allocated to a network data channel having higher performance, thereby a higher processing efficiency is ensured.

In detail, a sequence of the network data channels can include: Wi-Fi>LTE>WCDMA>GPRS, and a sequence of network services can include: network directed broadcast>data downloading>instant chat. Accordingly, according to the matching relationships of the above two sequences, the "network directed broadcast" service can be implemented through the Wi-Fi channel; the "data downloading" service can be implemented through the LTE channel; and the "instant chat" service can be implemented through the GPRS channel.

When a total quantity of all network services (e.g., network services that have been allocated and network services that have not been allocated) in the terminal is less than or equal to an amount of network data channels, a sequence of all the network services is arranged directly and allocated to a corresponding network data channel. If an allocated network service is executing a data interaction, the data interaction is paused and a network data channel of the allocated network service is switched to another network data channel, or the network data channel of the allocated network service is switched to another network data channel after the data interaction of the allocated network service has stopped.

When the total quantity of all network services in the terminal is greater than the quantity of the network data channels, the network services can be allocated according to the sequence, thereby occupying all network data channels enabled in the terminal, and implementing following methods:

In a first method, if each network data channel is limited to be allocated to a network service, when all network data channels have been allocated a corresponding network service, a waiting queue is established according to a sequence of requirements of network services that have not been allocated. In addition, a prompt message is generated for the user, such as a prompt message indicating the user that a current network service cannot be processed in time, or indicating the user to close some network services, thereby implementing a more important current network service timely.

In a second method, if each network data channel can be allocated to one or more network services, then, when each of the network data channels has been allocated one corresponding network service, it is determined whether surplus network resources exist, and it is further determined whether the surplus network resources are enough to allocate to a current initiated network service.

For example, it is assumed that a current network service needs a 30M bandwidth. Even though a network data channel has been allocated network service(s) already, when surplus network resources of the network data channel is equal to or more than 30M, the current network service is allocated to the network data channel.

When no network data channels can satisfy the current network service, the prompt message is generated for the user, such as a prompt message indicating the user that a current network service cannot be processed in time, or indicating the user to close some network services, thereby implementing a current important network service timely.

Third, parameter types:

In the above embodiment, preferably, the performance parameters include bandwidth information and/or speed information of each network data channel; and/or the requirement includes the a speed requirement and/or importance of the initiated network service.

In the above embodiment, the performance of the network data channel can be reflected by the bandwidth information, the speed information, and so on. The requirement of the initiated network service can be reflected by the speed requirement, the importance, and so on. In addition, the importance of the initiated network service can be reflected by instantaneity, privacy, priority, and so on.

Figure 5:
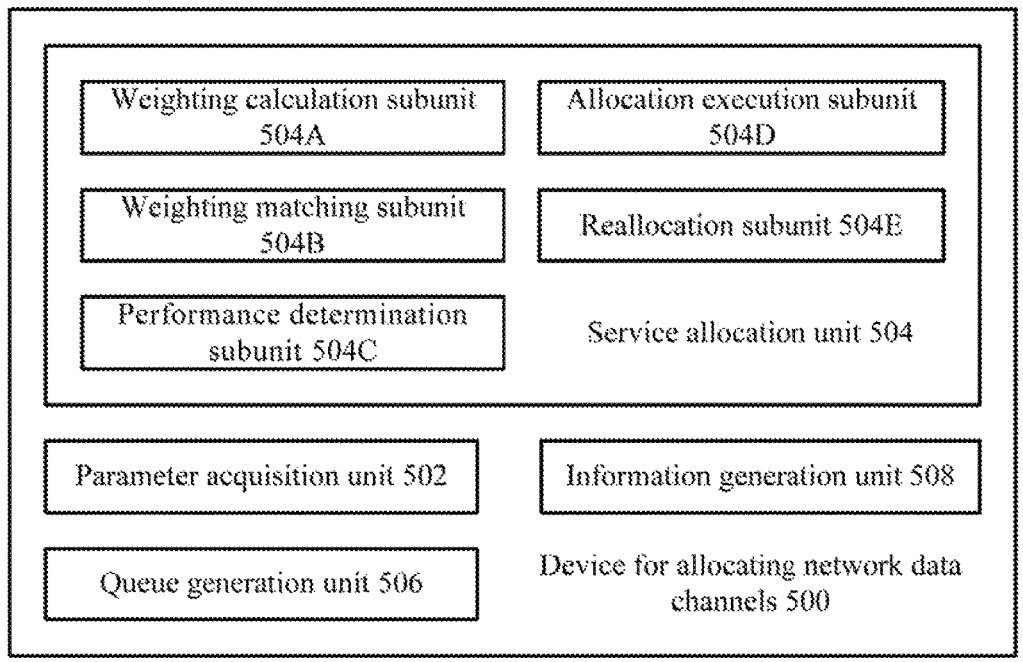
FIG. 5 shows a schematic diagram of one embodiment of a device for allocating network data channels according to the present disclosure.

FIG. 5 shows a schematic diagram of one embodiment of a device for allocating network data channels according to the present disclosure.

As shown in FIG. 5, a device for allocating network data channels 500 (hereinafter referred to as "the device 500") according to the present disclosure, includes a parameter acquisition unit 502 configured to acquire performance parameters of each network data channel enabled in a terminal; and a service allocation unit 504 configured to, according to the performance parameters of each network data channel and requirements of any initiated network service in the terminal, allocate the initiated network service to a corresponding network data channel.

The word "unit" as used hereinafter, refers to logic embodied in hardware or firmware, or to a collection of software instructions, written in a programming language, such as, for example, Java, C, or assembly. One or more software instructions in the function units may be embedded in firmware (e.g., the device 500). It will be appreciated that the function units may include connected logic units, such as gates and flip-flops, and may include programmable units, such as programmable gate arrays or processors. The function units described herein may be implemented as either software and/or hardware units and may be stored in a storage device. The storage device can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. The function units, when controlled by a processor, can execute the functions as mentioned above or as follows.

The device 500 can be a firmware, which may be installed in a terminal (e.g., a terminal 600 shown in FIG. 6), which includes at least one processor and a storage device. The parameter acquisition unit 502, the service allocation unit 504, and other units or subunits as described below, include computerized instructions in the form of one or more computer-readable programs that can be stored in the storage device of the terminal, and can be implemented by the at least one processor.

In the above embodiment, by removing a quantity limit of the network data channels enabled in the terminal, namely all network data channels supported by the terminal can be enabled at the same time, a plurality of concurrent network services of the terminal can be allocated to different network data channels. Thus, network resources of the network data channels can be utilized sufficiently, to avoid the plurality of network services occupying network source of a same network data channel, and improve the user experience.

By acquiring the performance parameters of each network data channel and the requirements of any initiated network service, the initiated network service is allocated to a corresponding network data channel reasonably, thereby a plurality of network services can implement high speed network interactions at the same time.

In the above embodiment, preferably, the parameter acquisition unit 502 acquires the performance parameters of each network data channel from network side; or executes a data transmission test of each network data channel, and calculates the performance parameters corresponding to each network data channel; or determines the performance parameters of each network data channel according to stored historical performance parameters.

In the above embodiment, it is helpful to ensure instantaneity and validity of the performance parameters by testing the performance parameters of the network data channels on the network side in real-time, thus the network services can be allocated more reasonably. In addition, a determination of current performance parameters of the network data channels according to the historical performance parameters is helpful in reducing transmission amount of network data and avoiding occupying corresponding network resources.

In the above embodiment, preferably, the service allocation unit 504 includes: a weighting calculation subunit 504A configured to calculate a weighting value of the initiated network service according to the requirements of any initiated network service, and determine a corresponding weighting value range of each network data channel according to the performance parameters of each network data channel; and a weighting matching subunit 504B configured to allocate the initiated network service to a network data channel, whose weighting value range includes the weighting value of the initiated network service.

In the above embodiment, the weighting value of the initiated network service represents a performance requirement of the initiated network service to the network data channel. By determining the corresponding weighting value range according to the performance parameters of each network data channel, a weighting relationship can be established between the initiated network service and each network data channel, thereby a network service allocation procedure can be quantized to implement an allocation of any initiated network service.

In the above embodiment, preferably, the service allocation unit 504 further includes: a performance determination subunit 504C configured to determine whether performance parameters of the network data channel satisfy both of the initiated network service and another network service; an allocation execution subunit 504C configured to allocate the initiated network service to the network data channel under the condition that the performance parameters of the network data channel satisfy both of the initiated network service and another network service, or allocate the initiated network service to another idle network data channel under the condition that the performance parameters of the network data channel does not satisfy both of the initiated network service and another network service.

In the above embodiment, generally, as a single network service does not occupy all network resources of one network data channel, thus, by determining the performance parameters of the network data channel, one network service can be allocated more accurately to avoid wasting the network resources.

In the above embodiment, preferably, the service allocation unit 504 further includes: a reallocation subunit 504E configured to reallocate the initiated network service to the network data channel under the condition that the network data channel has been detected to be idle or the performance parameters of the network data channel have been changed to satisfy the initiated network service.

In the above embodiment, a relationship between the initiated network service and the network data channel can be restored by monitoring a status of the network data channel. When an allocation of the initiated network service is changed from a high-performance network data channel to a low-performance network data channel, it is helpful to avoid influencing an implementation of anther network service which requires high performance. When the allocation of the initiated network service is changed from the low-performance network data channel to the high-performance network data channel, it is helpful for the initiated network service to utilize better network resources, thereby improving a processing speed of the initiated network service.

In the above embodiment, preferably, the service allocation unit 504 includes: a weighting calculation subunit 504A configured to calculate a weighting value of the initiated network service according to the requirements of any initiated network service; and a weighting matching subunit 504B configured to allocate the initiated network service to a corresponding network data channel according to matching relationships between a sequence of a plurality of weighting values of a plurality of initiated network services and a sequence of performance parameters of each network data channel.

In the above embodiment, no quantization relationship exists between each weighting value and each network data channel, and a network data channel is determined to be occupied by each of the plurality of initiated network services merely according to the sequence of the plurality of weighting values of the plurality of initiated network services. By allocating an initiated network service having high weighting value to a high-performance network data channel and allocating an initiated network service having low weighting value to a low-performance network data channel, an initiated network service having higher weighting value can be always allocated to a network data channel having higher performance, thereby a higher processing efficiency is ensured.

In the above embodiment, preferably, the device further includes a queue generation unit 506 and/or an information generation unit 508: the queue generation unit 506 configured to add the initiated network service in a waiting queue when all network data channels have been occupied and no network data channel satisfy the initiated network service; the information generation unit 508 configured to generate a corresponding prompt message for a user when all network data channels have been occupied and no network data channel satisfy the initiated network service.

In the above embodiment, when all network data channels have been occupied and the initiated network service cannot be allocated and implemented, the initiated network service can be implemented in sequence by establishing the waiting queue. In addition, one more important network service can be implemented timely by generating the prompt message for the user, such as a prompt message indicating the user that a current network service cannot be implemented in time, or indicating the user to close some network services.

In the above embodiment, preferably, the performance parameters include bandwidth information and/or speed information of each network data channel; and/or the requirement includes the a speed requirement and/or importance of the initiated network service.

In the above embodiment, the performance of the network data channel can be reflected by the bandwidth information, the speed information, and so on. The requirement of the initiated network service can be reflected by the speed requirement, the importance, and so on. In addition, the importance of the initiated network service can be reflected by instantaneity, privacy, priority, and so on.

Figure 6:
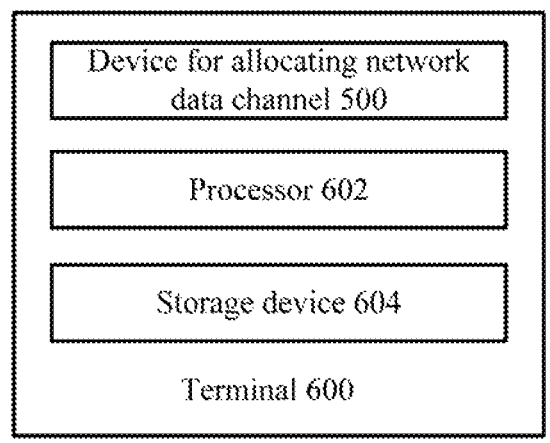
FIG. 6 shows a schematic diagram of one embodiment of a terminal according to the present disclosure.

FIG. 6 shows a schematic diagram of one embodiment of a terminal according to the present disclosure.

As shown in FIG. 6, according to one embodiment of the present disclosure, a terminal 600 includes the device 500 as shown in FIG. 5. The terminal 600 may be a mobile phone, a tablet computer, a personal digital assistant, a notebook computer, or other computing device. The terminal 600 further includes at least one processor 602 and a storage device 604. FIG. 6 illustrates only one example of the terminal 600 that may include more or fewer components than illustrated, or have a different configuration of the various components.

The at least one processor 602 is used to execute a plurality of units (e.g., the parameter acquisition unit 502 and the service allocation unit 504) or subunits in the device 500 and other applications, such as an operating system, installed in the terminal 600. The storage device 604 store the computerized instructions of a plurality of units or subunits in the device 500, and one or more programs, such as the operating system and applications of the terminal 600. The storage device 604 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The present disclosure has been explicated above by referring to the drawings. The present disclosure provides a method for allocating network data channels, a device for allocating network data channels, and a terminal. The present disclosure can allocate a network service to a corresponding network data channel reasonably according to actual requirements of the network service, thus each of a plurality of network services executed simultaneously can provide better user experience.

As will be appreciated by one skilled in the art, aspects of the present disclosure may be embodied as a method, a system, or a computer program product. Accordingly, aspects of the present disclosure may take the form of an entirely hardware embodiment, an entirely software embodiment, or an embodiment combining software and hardware. Furthermore, aspects of the present disclosure may take the form of a computer program product embodied in one or more computer readable medium(s) (including, but are not limited to a disk storage, a compact disc read-only memory (CD-ROM), an optical storage device, etc.) having computer readable program codes embodied thereon.

Aspects of the present disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, an embedded processing apparatus, or other programmable data processing apparatus to produce a machine, such that the instructions, which execute via the processor of the computer or other programmable data processing apparatus, create means for implementing one or more actions in flowchart and/or functions specified in the one or more blocks in block diagram.

These computer program instructions may also be stored in a computer readable medium that can direct a computer or other programmable data processing apparatus, or other devices to function in a particular manner, such that the instructions stored in the computer readable medium produce a product of manufacture including instructions which implement one or more actions in flowchart and/or functions specified in the one or more blocks in block diagram.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing one or more actions in flowchart and/or functions specified in the one or more blocks in block diagram.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for allocating network data channels to a terminal, the method comprising:
   acquiring performance parameters of each network data channel enabled in the terminal; and
   according to the performance parameters of each network data channel and requirements of an initiated network service in the terminal, allocating the initiated network service to a matched network data channel, comprising:
   calculating a weighting value of the initiated network service according to the requirements of the initiated network service;
   determining a corresponding weighting value range of each network data channel according to the performance parameters of each network data channel; and
   determining the matched network data channel, a weighting value range of the matched network data channel comprising the weighting value of the initiated network service.

2. The method of claim 1, wherein the performance parameters of each network data channel are acquired by:
   acquiring the performance parameters of each network data channel from network side; or
   executing a data transmission test of each network data channel, and calculating the performance parameters corresponding to each network data channel; or
   determining the performance parameters of each network data channel according to stored historical performance parameters.

3. The method of claim 1, when the matched network data channel has been occupied by another network service, further comprising:
   determining whether performance parameters of the matched network data channel satisfy both of the initiated network service and another network service;
   allocating the initiated network service to the matched network data channel under the condition that the performance parameters of the matched network data channel satisfy both of the initiated network service and another network service, or allocating the initiated network service to another idle network data channel under the condition that the performance parameters of the matched network data channel do not satisfy both of the initiated network service and another network service.

4. The method of claim 3, when the initiated network service has been allocated to another idle network data channel, further comprising:
   reallocating the initiated network service to the matched network data channel under the condition that the matched network data channel has been detected to be idle or the performance parameters of the matched network data channel have been changed to satisfy the initiated network service.

5. The method of claim 3, wherein allocating the initiated network service to another idle network data channel comprising:
   selecting another idle network data channel which has higher performance parameters when an idle network data channel has higher performance parameters; or
   selecting another idle network data channel according to a sequence from low to high when a plurality of idle network data channels have higher performance parameters; or
   selecting another idle network data channel which has lower performance parameters when no idle network data channel has higher performance parameters; or
   selecting another idle network data channel according to a sequence from high to low when a plurality of idle network data channels have lower performance parameters.

6. The method of claim 1, wherein the matched network data channel is also determined
   according to matching relationships between a sequence of a plurality of weighting values of a plurality of initiated network services and a sequence of performance parameters of each network data channel.

7. The method of claim 1, when each network data channel has been occupied and no network data channel satisfies the initiated network service, further comprising:
   adding the initiated network service into a waiting queue; and/or
   generating a corresponding prompt message for a user.

8. The method of claim 1, wherein:
   the performance parameters comprise bandwidth information and/or speed information of each network data channel; and/or
   the requirement comprises a speed requirement and/or importance of the initiated network service.

9. A terminal, comprising:
   at least one processor; and
   a storage device storing a plurality of instructions, which when executed by the processor, causes the at least one processor to:
   acquire performance parameters of each network data channel enabled in the terminal; and
   according to the performance parameters of each network data channel and requirements of an initiated network service in the terminal, allocate the initiated network service to a matched network data channel, comprising:
   calculating a weighting value of the initiated network service according to the requirements of the initiated network service;
   determining a corresponding weighting value range of each network data channel according to the performance parameters of each network data channel; and determining the matched network data channel, a weighting value range of the matched network data channel comprising the weighting value of the initiated network service.

10. The terminal of claim 9, wherein the performance parameters of each network data channel are acquired by:
    acquiring the performance parameters of each network data channel from network side; or
    executing a data transmission test of each network data channel, and calculating the performance parameters corresponding to each network data channel; or
    determining the performance parameters of each network data channel according to stored historical performance parameters.

11. The terminal of claim 9, when the matched network data channel has been occupied by another network service, the at least one processor further:
    determines whether performance parameters of the matched network data channel satisfy both of the initiated network service and another network service;
    allocates the initiated network service to the matched network data channel under the condition that the performance parameters of the matched network data channel satisfy both of the initiated network service and another network service, or allocates the initiated network service to another idle network data channel under the condition that the performance parameters of the matched network data channel do not satisfy both of the initiated network service and another network service.

12. The terminal of claim 11, wherein the at least one processor further:
    reallocates the initiated network service to the matched network data channel under the condition that the matched network data channel has been detected to be idle or the performance parameters of the matched network data channel have been changed to satisfy the initiated network service.

13. The terminal of claim 11, wherein the at least one processor further:
    selects another idle network data channel which has higher performance parameters when an idle network data channel has higher performance parameters; or
    selects another idle network data channel according to a sequence from low to high when a plurality of idle network data channels have higher performance parameters; or
    selects another idle network data channel which has lower performance parameters when no idle network data channel has higher performance parameters; or
    selects another idle network data channel according to a sequence from high to low when a plurality of idle network data channels have lower performance parameters.

14. The terminal of claim 9, wherein the at least one processor further:
    determines the matched network data channel according to matching relationships between a sequence of a plurality of weighting values of a plurality of initiated network services and a sequence of performance parameters of each network data channel.

15. The terminal of claim 9, wherein the at least one processor further:
    adds the initiated network service into a waiting queue and generates a corresponding prompt message for a user, when each network data channel has been occupied and no network data channel satisfies the initiated network service.

16. The terminal of claim 9, wherein:
    the performance parameters comprise bandwidth information and/or speed information of each network data channel; and/or
    the requirement comprises a speed requirement and/or importance of the initiated network service.

17. A non-transitory storage medium having stored thereon instructions that, when executed by a processor of a terminal, causes the terminal to perform a method for allocating network data channels to the terminal, the method comprising:
    acquiring performance parameters of each network data channel enabled in the terminal; and
    according to the performance parameters of each network data channel and requirements of an initiated network service in the terminal, allocating the initiated network service to a matched network data channel, comprising:
    calculating a weighting value of the initiated network service according to the requirements of the initiated network service;
    determining a corresponding weighting value range of each network data channel according to the performance parameters of each network data channel; and
    determining the matched network data channel, a weighting value range of the matched network data channel comprising the weighting value of the initiated network service.

18. The non-transitory storage medium according to claim 17, wherein the performance parameters of each network data channel are acquired by:
    acquiring the performance parameters of each network data channel from network side; or
    executing a data transmission test of each network data channel, and calculating the performance parameters corresponding to each network data channel; or
    determining the performance parameters of each network data channel according to stored historical performance parameters.

19. The non-transitory storage medium according to claim 17, when the matched network data channel has been occupied by another network service, wherein the method further comprises:
    determining whether performance parameters of the matched network data channel satisfy both of the initiated network service and another network service;
    allocating the initiated network service to the matched network data channel under the condition that the performance parameters of the matched network data channel satisfy both of the initiated network service and another network service, or allocating the initiated network service to another idle network data channel under the condition that the performance parameters of the matched network data channel do not satisfy both of the initiated network service and another network service.

20. The non-transitory storage medium according to claim 17, wherein the matched network data channel is also determined according to matching relationships between a sequence of a plurality of weighting values of a plurality of initiated network services and a sequence of performance parameters of each network data channel.

* * * * *